3,362,817
BONDING COMPOSITION FOR INTEGRALLY JOINING CARBONACEOUS PRODUCTS TO EACH OTHER AND TO METALS

Georges Micaud, Chatillon-sous-Bagneux, and André Galy, Grenoble, France, assignors to Commissariat à l'Energie Atomique and Societe dite Pechiney Compagnie de Produits Chimiques et Electrometallurgiques, Paris, France No Drawing. Filed Nov. 17, 1964, Ser. No. 411,885
Claims priority, application France, Nov. 21, 1963, 954,520
5 Claims. (Cl. 75—177)

The present invention relates to a bonding compound for integrally joining carbonaceous products to each other and to metals.

Many attempts have already been made with a view to bonding different carbonaceous products either to each other or to metals. There has thus already been described the utilization of iron alloyed with chromium, nickel, molybdenum, tungsten, titanium or zirconium for the purpose of bonding parts of graphite at temperatures within the range of 1200 to 1600° C. Unfortunately, these bonds give rise to difficult corrosion problems and, in view of the fact that they contain materials having a high effective capture cross-section, such bonds result in a not negligible neutron absorption and accordingly give rise to difficulties when employed for nuclear purposes, which are among the main uses to which bonds of this type are applied. The utilization of pure metals such as molybdenum has also been contemplated but this makes it necessary to perform the joining operations at high temperatures (2600° C.). The use of bonding agents of this last-mentioned type cannot be contemplated, particularly in the case of pyrocarbons such as those described in French patent application No. 1,342,813 as filed on Aug. 28, 1962 by the Commissariat à l'Energie Atomique in respect of "Improvements Made in Pyrocarbons and in Their Methods of Fabrication," wherein said pyrocarbons are fabricated between 1400° and 1600° C. and must not be heated to higher temperatures.

The present invention proposes to provide a bonding compound which has a relatively low melting point and which serves to form solid joints between graphite and graphite, between graphite and metal (such as zirconium, molybdenum, stainless steel or ordinary steel, etc.) between graphite and pyrocarbon or between pyrocarbon and pyrocarbon.

A further object of this invention is to provide a bonding compound of this type which can be employed in nuclear applications.

The bonding compound in accordance with the invention is especially characterized in that it comprises 83 to 97% by weight of zirconium and 17 to 3% by weight of beryllium.

Further characteristic features and advantages of the invention will appear from the description which now follows.

According to one form of embodiment of the invention, the bonding compound consists of 83 to 97% zirconium and 17 to 3% beryllium, one of the preferred compositions consisting of approximately 90% Zr and approximately 10% Be. There is thus obtained a bonding agent having a melting point which varies according to its composition between 1,000 and 1,200° C. approximately and which has good mechanical properties and good nuclear properties; it is thus possible by means of this bonding agent to carry out indifferently the bonding of objects of graphite and of pyrocarbon either to each other or to metals, in particular to zirconium, molybdenum and steels. In view of its very low neutron absorption coefficient, this bonding compound is particularly recommended for the purpose of joining structural materials which are designed to be employed in nuclear reactors.

According to another characteristic feature of the invention, if it is desired to obtain a bond having improved mechanical properties combined with a lowering of the melting point, a part of the beryllium in the above compound is replaced by molybdenum in a quantity which is either equal to or less than 4% by weight. Accordingly, a bonding compound comprising approximately 88% Zr, approximately 8% Be and approximately 4% Mo has a melting point in the vicinity of 1100° C.

In order to prepare the bonding compound in accordance with the invention, the constituent metals are advantageously employed in the form of a powder or small fragments which are intimately mixed so as to obtain a homogeneous composition which can if so required be shaped either into rods or wires.

The bonding operation is performed either in a vacuum or in an inert or non-oxidizing atmosphere by placing the compound between the members to be bonded together and by heating said compound to a temperature which is suitable for the purpose of melting this latter, either in a vacuum furance by employing an inductance coil or by making use of any other means such as an argon blow-pipe, for example. It is essential to perform the operation either in vacuo or in an inert or non-oxidizing atmosphere in order to prevent processes of oxidation of carbon and of the bonding metals.

The following non-limitative examples are given by way of illustration of the invention.

In all the examples given below, the bonding operation is carried out in a vacuum furnace, the heating being localized in the bond zone by means of an inductance coil.

Example 1

A piece of nuclear grade graphite was integrally joined to a piece of pyrocarbon by employing a compound consisting of 90% by weight of Zr powder and 10% by weight of Be powder and by heating to a temperature of 1200° C. in the bond zone. Those pores of the nuclear grade graphite which are located in the vicinity of the mating surface are filled with the bonding agent and this latter closely conforms to the surface irregularities of the pyrocarbon as was observed in a photomicrograph of this bond in polarized light with a magnification of 100×. In a photomicrograph taken with a magnification of 1200× the excellent bond which is formed between the bonding agent and the pyrocarbon was shown.

Example 2

Two pyrocarbon members were integrally joined together by employing the bonding compound of Example 1 so that the bonding agent perfectly infiltrates into the fissures of the pyrocarbon.

Example 3

A bond between a pyrocarbon member and molybdenum member was formed by employing a bonding compound consisting of 88% Zr, 8% Be and 4% molybdenum by weight, the metals being employed in the form of a powder and the temperature in the bond zone being 1100° C.

Excellent cohesion of the three elements was observed in a photomicrograph of the bond area will be noticed from FIG. 4 of the accompanying drawings. This micrography was taken in polarized light with a magnification of 100×.

Example 4

A bond between a nuclear grade graphite member and a member of 18/8 stainless steel was formed by employing the same bonding compound as in Example 3. It was observed in a photomicrograph that the bonding agent or compound penetrated extensively within the porosity of the graphite and that the bond which is thus formed between metal, bonding agent and graphite is of excellent quality.

Impermeability tests carried out have shown that the bonds according to the invention were strictly impervious to gases at room temperature within the limits of detection of the measuring instrument employed (coefficient of permeability $k \cong 10^{-7}$ cm.$^2$ s$^{-1}$).

In order to determine the behaviour in the hot state of a graphite-graphite assembly or pyrocarbon-pyrocarbon assembly which is bonded by making use of the alloy of Example 3, the coefficient of thermal expansion of this alloy has been studied.

The mean coefficient of thermal expansion $\alpha_{20}^{500}$ of the bonding agent is $10 \times 10^{-6}$ ° C$^{-1}$ whereas nuclear grade graphite and pyrocarbon have respectively, in the preferential directions, coefficients of expansion within the range of 2 to $5 \times 10^{-6}$ ° C$^{-1}$ on the one hand, and 3 to $6 \times 10^{-6}$ ° C$^{-1}$ on the other hand.

These expansion coefficients are only slightly different from each other, which explains the good thermal resistance of the bonded assemblies, this result being additionally confirmed by the absence of any fracture during the cooling of the members.

The mechanical properties of the bonds formed are excellent. Tensile tests and bending tests performed at room temperature have resulted in fracture of either the pyrocarbon or the graphite outside the bond zone. However, it must be pointed out that these bonds have a high degree of hardness and must accordingly be machined with special tools fitted with tungsten-carbide tips or diamond tips.

There has thus been provided by means of our invention a bonding compound which permits the possibility of integrally joining carbonaceous products both to each other and to metals, which has excellent properties and one of the characteristic features of which is to melt at a temperature within the range of 1000° C. to 1400° C. approximately. The alloys which are formed at the moment of melting wet the carbonaceous surfaces perfectly, with the result that excellent mechanical cohesion is achieved. As a consequence, these bonding agents can be employed for a large number of purposes and in addition, their neutron absorption capacity can be considered as negligible, which is highly important in nuclear applications.

It will be readily understood that the invention is not limited to the forms of embodiment which have been illustrated and described and which have been given solely by way of example.

What we claim is:

1. Bonding composition for integrally joining carbonaceous bodies to each other and to metals consisting essentially of 83 to 97% by weight of zirconium and 17 to 3% by weight of beryllium, a part of the beryllium being replaced by molybdenum in a quantity which is either less than or equal to 4% by weight.

2. Bonding composition in accordance with claim 1, said composition consisting of 90% by weight of zirconium and 10% by weight of beryllium.

3. Bonding composition in accordance with claim 1 said composition consisting of 88% by weight of zirconium, 8% by weight of beryllium and 4% by weight of molybdenum.

4. Bonding composition as described in claim 1, the carbonaceous bodies being selected from the group consisting of nuclear grade graphite and pyrocarbon.

5. Bonding composition as described in claim 1, the metals to be bonded to the carbonaceous product being selected from the group consisting of zirconium, molybdenum, ordinary steel and stainless steel.

References Cited

Journal of Metals: Hausner, H. H. and Kalish, H. S., vol. 188, January 1950, p. 60.

AECL Industrial Symposium-990; April 1960, paper 11, pp. 11.14 and 11.15.

HYLAND BIZOT, *Primary Examiner.*

DAVID L. RECK, *Examiner.*

W. W. STALLARD, *Assistant Examiner.*